(12) United States Patent
Marriott (10) Patent No.: US 7,398,992 B2
(45) Date of Patent: Jul. 15, 2008

(54) AIR BAG

(75) Inventor: Brandon Scott Marriott, Farmington Hills, MI (US)

(73) Assignee: TK Holdings Inc., Auburn Hills, MI (US)

(*) Notice: Subject to any disclaimer, the term of this patent is extended or adjusted under 35 U.S.C. 154(b) by 312 days.

(21) Appl. No.: 10/989,773

(22) Filed: Nov. 15, 2004

(65) Prior Publication Data

US 2005/0151359 A1 Jul. 14, 2005

Related U.S. Application Data

(60) Provisional application No. 60/523,166, filed on Nov. 18, 2003.

(51) Int. Cl.
*B60R 21/16* (2006.01)

(52) U.S. Cl. ............ 280/729; 280/742; 280/743.1

(58) Field of Classification Search ............ 280/729, 280/743.2, 742, 743.1
See application file for complete search history.

(56) References Cited

U.S. PATENT DOCUMENTS

| | | | |
|---|---|---|---|
| 4,265,468 A | 5/1981 | Suszko et al. ............ 280/740 |
| 4,332,398 A | 6/1982 | Smith ............ 280/732 |
| 5,018,762 A | 5/1991 | Suzuki et al. ............ 280/731 |
| 5,160,164 A * | 11/1992 | Fischer et al. ............ 280/743.2 |
| 5,172,933 A | 12/1992 | Strasser ............ 280/740 |
| 5,249,824 A | 10/1993 | Swann et al. ............ 280/729 |
| 5,282,646 A | 2/1994 | Melvin et al. ............ 280/729 |
| 5,494,314 A * | 2/1996 | Kriska et al. ............ 280/740 |
| 5,520,415 A * | 5/1996 | Lewis et al. ............ 280/743.1 |
| 5,542,695 A | 8/1996 | Hanson ............ 280/729 |
| 5,570,900 A | 11/1996 | Brown ............ 280/729 |
| 5,573,270 A * | 11/1996 | Sogi et al. ............ 280/740 |
| 5,577,765 A * | 11/1996 | Takeda et al. ............ 280/729 |
| 5,599,041 A | 2/1997 | Turnbull et al. ............ 280/724 |
| 5,636,861 A | 6/1997 | Orsulak et al. ............ 280/730.1 |
| 5,853,191 A | 12/1998 | Lachat ............ 280/730.2 |
| 5,901,979 A | 5/1999 | Schneider et al. ............ 280/738 |
| 5,918,902 A * | 7/1999 | Acker et al. ............ 280/743.1 |
| 5,938,233 A | 8/1999 | Specht ............ 280/730.2 |
| 5,951,038 A * | 9/1999 | Taguchi et al. ............ 280/729 |
| 5,957,486 A | 9/1999 | Taguchi et al. ............ 280/729 |
| 6,086,092 A | 7/2000 | Hill ............ 280/729 |
| 6,089,599 A * | 7/2000 | Schimmoller et al. ............ 280/740 |
| 6,099,028 A | 8/2000 | Seifert ............ 280/728.3 |
| 6,158,765 A | 12/2000 | Sinnhuber ............ 280/728.3 |

(Continued)

OTHER PUBLICATIONS

International Search Report and Written Opinion of the International Searching Authority in International Application No. PCT/US04/38205.

*Primary Examiner*—Christopher Bottorff
*Assistant Examiner*—Timothy Wilhelm
(74) *Attorney, Agent, or Firm*—Foley & Lardner LLP (57) ABSTRACT

An inner panel of an air bag cooperates with a first panel portion of the air bag so as to define a duct having an entrance adapted to receive gas from a gas generator through an opening in the first panel portion. The terminus of the duct provides for discharging the gas to a distal location within the air bag, so as to provide for relatively early inflation thereof. The inner panel may be vented into the interior of the air bag so as to provide for tuning inflation kinematics.

11 Claims, 6 Drawing Sheets

U.S. PATENT DOCUMENTS

| | | | |
|---|---|---|---|
| 6,170,857 B1 * | 1/2001 | Okada et al. | 280/728.1 |
| 6,176,512 B1 | 1/2001 | Rodriguez | 280/728.2 |
| 6,224,101 B1 * | 5/2001 | Nishijima et al. | 280/743.2 |
| 6,247,721 B1 | 6/2001 | Lang | 280/728.2 |
| 6,260,877 B1 | 7/2001 | Rasmussen, Sr. | 280/729 |
| 6,270,113 B1 | 8/2001 | Wipasuramonton et al. | 280/730.2 |
| 6,334,625 B1 * | 1/2002 | Pausch et al. | 280/729 |
| 6,352,283 B1 * | 3/2002 | Ellerbrok et al. | 280/743.1 |
| 6,352,284 B1 * | 3/2002 | Okada et al. | 280/743.1 |
| 6,361,067 B1 * | 3/2002 | Varcus et al. | 280/729 |
| 6,371,518 B1 * | 4/2002 | Kalandek et al. | 280/743.1 |
| 6,394,488 B2 | 5/2002 | Karlbauer et al. | 280/730.2 |
| 6,428,042 B1 | 8/2002 | Fischer et al. | 290/739 |
| 6,457,740 B1 | 10/2002 | Vaidyaraman et al. | 280/730.2 |
| 6,471,244 B1 * | 10/2002 | Nishijima et al. | 280/742 |
| 6,478,331 B1 | 11/2002 | Lang | 280/740 |
| 6,502,854 B2 | 1/2003 | Mueller | 280/730.1 |
| 6,554,316 B2 | 4/2003 | Schneider et al. | 280/743.1 |
| 6,568,706 B2 | 5/2003 | Mueller | 280/730.2 |
| 6,598,903 B2 | 7/2003 | Okada et al. | 280/743.2 |
| 6,616,177 B2 | 9/2003 | Thomas et al. | 280/729 |
| 6,669,229 B2 * | 12/2003 | Thomas | 280/732 |
| 6,739,619 B2 | 5/2004 | Mueller | 280/730.2 |
| 6,926,303 B2 * | 8/2005 | Fischer et al. | 280/729 |
| 2002/0101066 A1 | 8/2002 | Tanase et al. | 280/730.2 |
| 2003/0034637 A1 | 2/2003 | Wang et al. | 280/729 |
| 2003/0111829 A1 | 6/2003 | Tesch | 280/730.2 |
| 2003/0141708 A1 | 7/2003 | Enders | 280/730.2 |
| 2003/0201628 A1 * | 10/2003 | Roychoudhury et al. | 280/729 |
| 2004/0113399 A1 | 6/2004 | Yoshikawa et al. | 280/730.1 |
| 2005/0052008 A1 * | 3/2005 | Rose et al. | 280/740 |
| 2006/0197327 A1 * | 9/2006 | Maripudi et al. | 280/740 |

* cited by examiner

AIR BAG

CROSS-REFERENCE TO RELATED APPLICATIONS

The instant application claims the benefit of prior U.S. Provisional Application Ser. No. 60/523,166 filed on Nov. 18, 2003, which is incorporated herein by reference.

DESCRIPTION OF EMBODIMENT(S)

Figure 1:
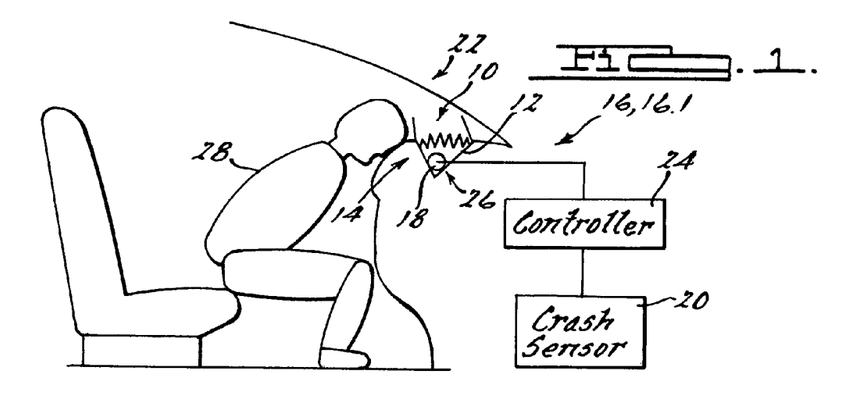
FIG. 1 illustrates and out-of-position (OOP) occupant in a vehicle, wherein the vehicle incorporates an air bag safety restraint system.

Referring to FIG. 1, an air bag 10 attached to a housing 12 of an air bag inflator module 14 of an air bag safety restraint system 16 is inflated by a gas generator 18 therein responsive to the detection by a crash sensor 20 of a crash of a vehicle 22, and the resulting generation of an actuation signal by a controller 24 operatively associated therewith, whereby the actuation signal is coupled to an igniter 26 of the gas generator 18 causing an actuation thereof, whereby gas generated by the gas generator 18 causes the air bag 10 to inflate, thereby providing for mitigation of injury to an occupant 28 of the vehicle 22 at a seating location associated with the air bag inflator module 14, without adversely affecting the dynamic restraint capability of the air bag 10 under relatively high speed crash conditions for relatively large occupants 28, in accordance with government automotive safety regulations. FIG. 1 illustrates an out-of-position (OOP) occupant 28 positioned so as to be susceptible to injury by the inflation of an air bag inflator module 14 if not otherwise adapted to mitigate injury to such an out-of-position occupant 28.

Figures 2, 3:
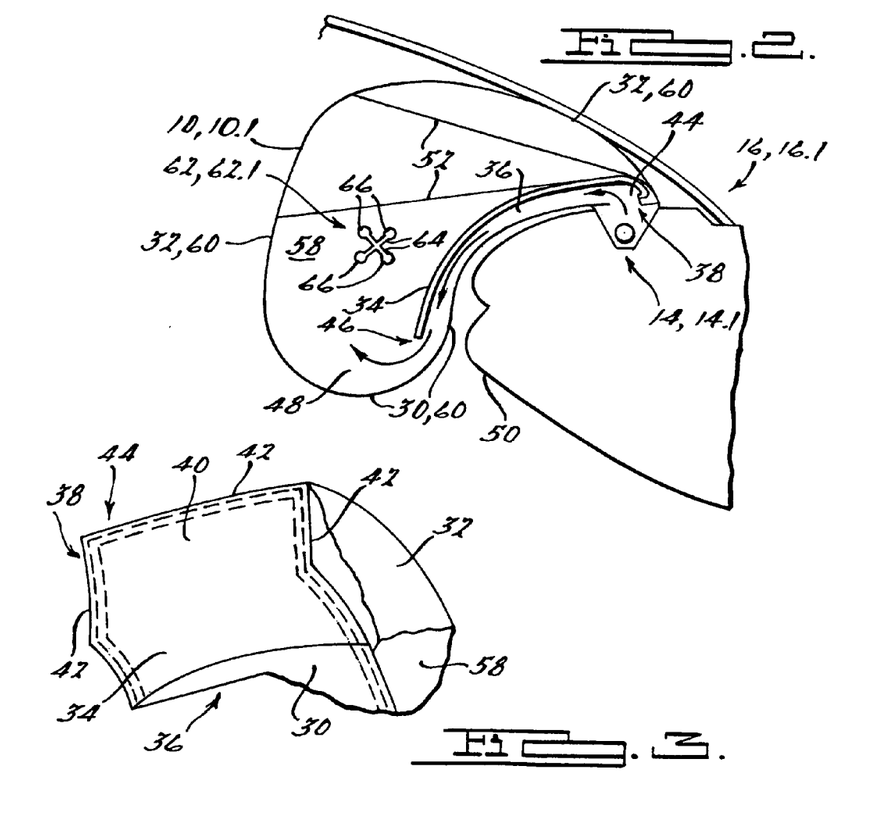
FIG. 2 illustrates a longitudinal cross-sectional view of a first embodiment of an air bag incorporating an internal duct.
FIG. 3 illustrates an isometric fragmentary sectional view of an inlet portion of the air bag illustrated in FIG. 2.

Referring to FIG. 2, the air bag 10 comprises a first 30 and second 32 panel portions that delineate opposite faces of the air bag 10. For example, in a frontal air bag safety restraint system 16.1, when the air bag 10 is inflated, the first panel portion 30 is generally forward of the second panel portion 32, and for a top mount air bag inflator module 14.1 also illustrated in FIG. 2, portions of first panel portion 30 are below associated portions of the second panel portion 32. The air bag 10 further incorporates an inner panel 34 which cooperates with the first panel portion 30 so as to define a duct 36 therebetween. The inner panel 34 incorporates an opening 38 which is adapted to attach to the housing 12 of the air bag inflator module 14, and through which the air bag 10 is inflated therefrom. The duct 36 provides for inflating the air bag 10, and the volume of the air bag 10—which provides for occupant restraint—is substantially greater than that of the duct 36.

Referring also to FIG. 3, in accordance with a first embodiment of an air bag 10.1 incorporating a duct 36, a first end 40 of the inner panel 34 is secured to a portion of the perimeter 42 of the opening 38 of the air bag 10.1 in the first panel portion 30, so as to define an entrance 44 of the duct 36 which is adapted to receive substantially all of the gas generated by the gas generator 18 that enters the opening 38 of the air bag 10.1 from the housing 12 of the air bag inflator module 14, which then pressurizes and flows through the duct 36 and discharges from the terminus 46 thereof proximate to or towards a distal portion 48 of the air bag 10.1 that is distal relative to the opening 38 thereof. Accordingly, the duct 36 in the air bag 10.1 provides for inflating the air bag 10.1 from the bottom up, rather than from the top down as would otherwise occur without the diversion of gas flow provided for by the duct 36, which causes the air bag 10.1 to preferentially inflate downwards along the instrument panel 50, thereby increasing the probability that the inflating air bag 10.1 will deploy between the instrument panel 50 and an out-of-position occupant 28—e.g. in a position illustrated in FIG. 1—which provides for reducing the magnitude of loading of the head and neck—e.g. the axial and moment loading measures, and the Neck-ij measure—of an occupant 28 in relative close proximity to the air bag inflator module 14, thereby reducing the likelihood of injury to the out-of-position occupant 28 from a deployment of the air bag inflator module 14.

In addition to reducing the risk of injury to out-of-position occupants 28, the duct 36 provides for decoupling the dynamic impact performance of the air bag safety restraint system 16 from the out-of-position occupant performance, thereby providing for the use of relatively higher-output/higher-onset inflators to improve NCAP rating and dynamic performance, than might otherwise be possible.

The air bag 10.1 illustrated in FIG. 2 incorporates a plurality of tethers 52 which help to control the inflating and inflated shape of the air bag 10.1, wherein each tether 52 at one end is secured to the air bag inflator module 14 proximate to the opening 38 of the air bag 10.1, e.g. by sewing, bonding, riveting, or welding to a portion of the air bag 10.1, or, for example, by clamping to the housing 12. The other end of the tether 52 is fastened to the inside of the air bag 10.1, e.g. by sewing, bonding or welding. The incorporation of tethers 52, and if incorporated, the number and design of the tethers 52, and the particular shape and dimensions of a particular air bag 10, is dependent upon the particular requirements of a particular vehicle 22.

Figure 4:
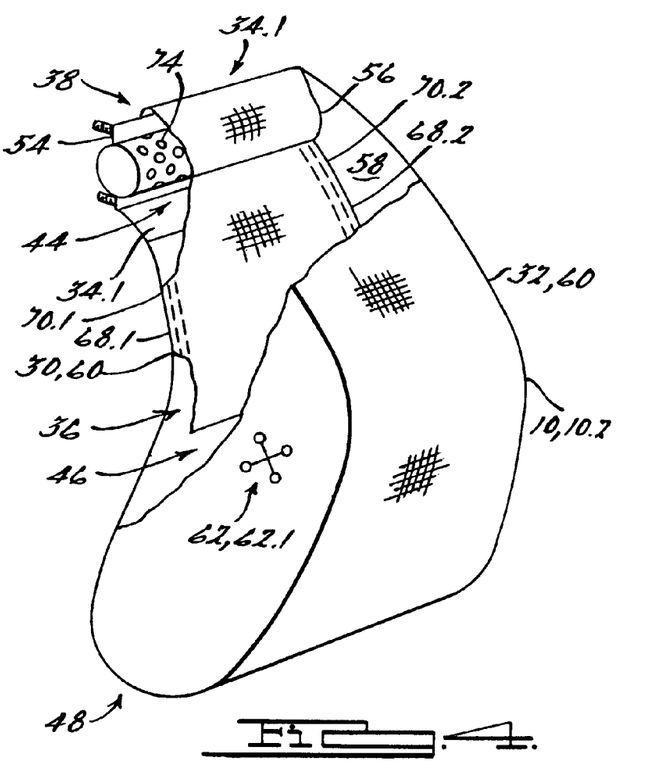
FIG. 4 illustrates an isometric fragmentary sectional view of a second embodiment of an air bag incorporating an internal duct.

Referring also to FIG. 4, in accordance with a second embodiment of an air bag 10.2 incorporating a duct 36, the first end portion 34.1 of the inner panel 34 is wrapped around an air bag retainer 54 of the air bag inflator module 14, and the first end 40 of the inner panel 34 is clamped between the air bag retainer 54 and the housing 12 of the air bag inflator module 14, thereby defining the entrance 44 of the associated duct 36 through which at least a substantial portion of the gas from the gas generator 18 is directed. For example, if the edges 56 of the first end 40 of the inner panel 34 are substantially sealably fastened, e.g. sewn, to associated side panels 58 of the air bag 10.2, then substantially all of the gas entering the opening 38 of the air bag 10.2 from the gas generator 18 would be directed through the duct 36. The first end portion 34.1 wrapped around the air bag retainer 54 and extending over a portion of the second panel portion 32 of the air bag 10.2 also acts as a heat shield.

The outer surface of each of the air bags 10.1, 10.2 illustrated in FIGS. 2 and 4 comprises a face panel 60 and two side panels 58 (the overall construction of which is generally illustrated in FIG. 4), which are either constructed of separate pieces of air bag material, e.g. a fabric, e.g. of nylon or polyester weave, which may be coated, e.g. with a silicone rubber coating; some other material that is known for use in fabricating an air bag such as plastic film or polyolefin (e.g. TYVEK®), or some other material that is sufficiently flexible, strong and durable. For example, the face panel 60 and side panels 58 may be separate pieces of air bag material that are joined by, for example, sewing, bonding or welding. A single face panel 60 extends around the longitudinal cross-sectional perimeter of the air bag 10. One or both side panels 58 incorporate at least one vent 62 which provides for the venting of inflation gas from the air bag 10.1 so as to provide for dissipating the energy of the occupant 28 following a crash of the vehicle 22. The vents 62 provide for tuneability of dynamic ride-down performance of the occupant 28 in a crash, and are sized in accordance with particular requirements of a particular vehicle 22. For example, the vents 62 generally would be sufficiently large so as to prevent rebound of the occupant 28 following a crash, yet sufficiently small so as to provide for adequate cushioning of the occupant 28 from hard surfaces—e.g. the instrument panel 50—within the vehicle 22. For example, the air bag illustrated in FIG. 2 incorporates what is known as an "X-vent" 62.1, which is formed by making "X"-shaped cuts 64 between four associated stress relief holes 66. In an alternative embodiment, the vents 62 could be of circular or some other shape. In yet another alternative embodiment, the housing 12 of the air bag inflator module 14 could be adapted so as to provide for venting the air bag 10.

Figure 5:
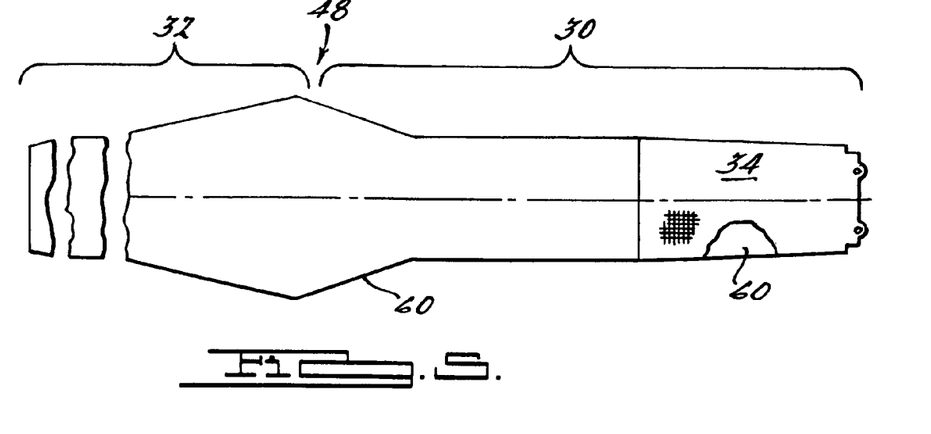
FIG. 5 illustrates a face panel and an inner panel of the air bags illustrates in FIG. 4.

Referring to FIGS. 4 and 5, the inner panel 34 is substantially the same width and shape as the associated first panel portion 30 of the air bag 10.2, which provides for simultaneously fastening, e.g. sewing, an edge 68.1, 68.2 of the first panel portion 30 to both the associated side panel 58 and to a corresponding edge 70.1, 70.2 of the inner panel 34. FIG. 5 illustrates the inner panel 34 overlaid on the associated face panel 60. In one embodiment, the face panel 60 and side panels 58 are constructed of silicone coated nylon fabric with the coating sides 72 facing the inside of the air bag 10.2, and the inner panel 34 is also constructed of silicone coated nylon fabric with the coating side 72 facing the air bag retainer 54.

Figure 6:
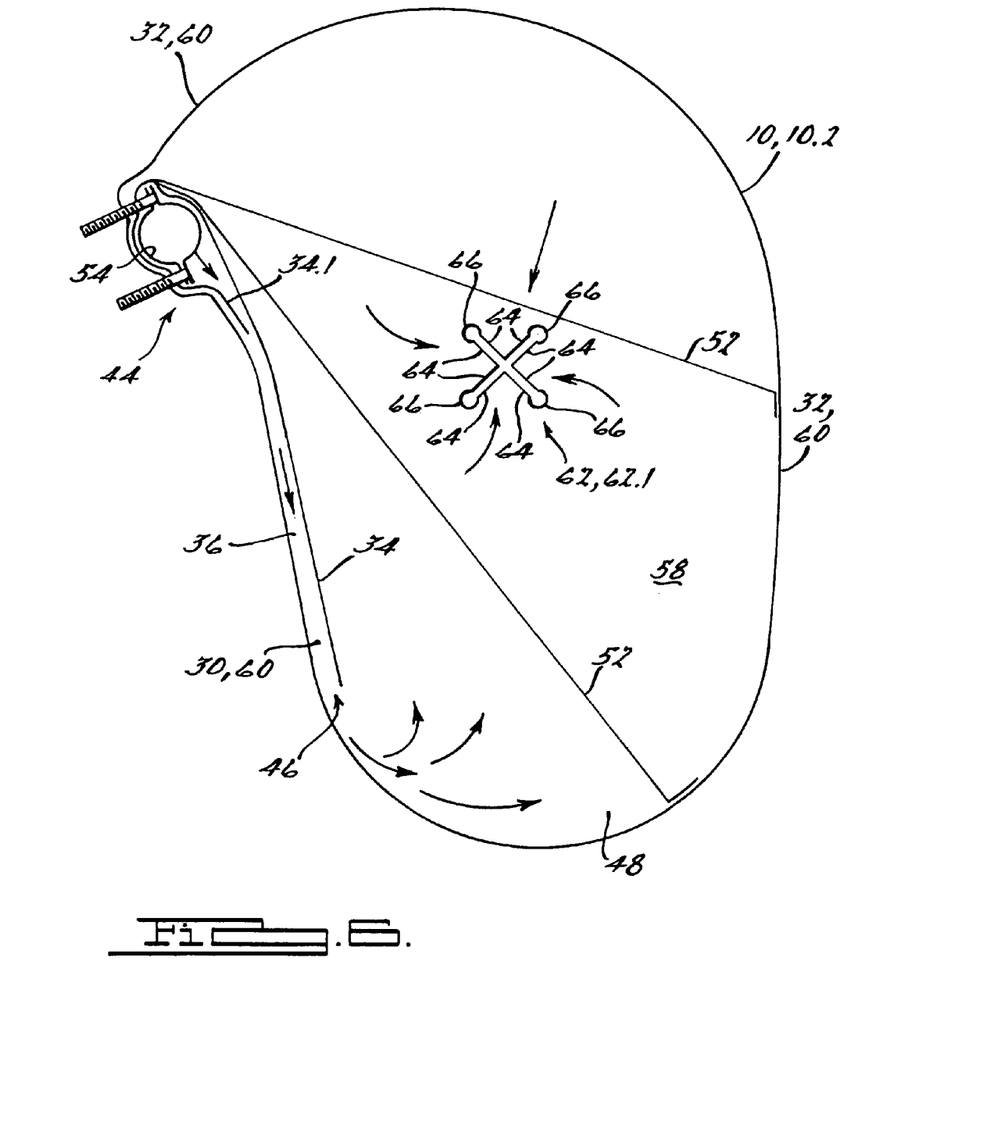
FIG. 6 illustrates a longitudinal cross-sectional view of the air bag illustrated in FIG. 4.

Referring to FIGS. 4 and 6, in operation of the second embodiment of the air bag 10.2, gas from the gas generator 18 of the air bag inflator module 14 flows through a plurality of holes 74 in the air bag retainer 54 and then into the entrance 44 of the duct 36, which pressurizes the duct 36. The gas flows though the duct 36 and is discharged from the terminus 46 thereof into a distal portion 48 of the air bag 10.2 whereupon the gas fills the volume of the air bag 10.2 bounded by the second panel portion 32. Excess gas, or gas used to dissipate the energy of the occupant 28, is discharged through one or more associated vents 62.

Figure 7:
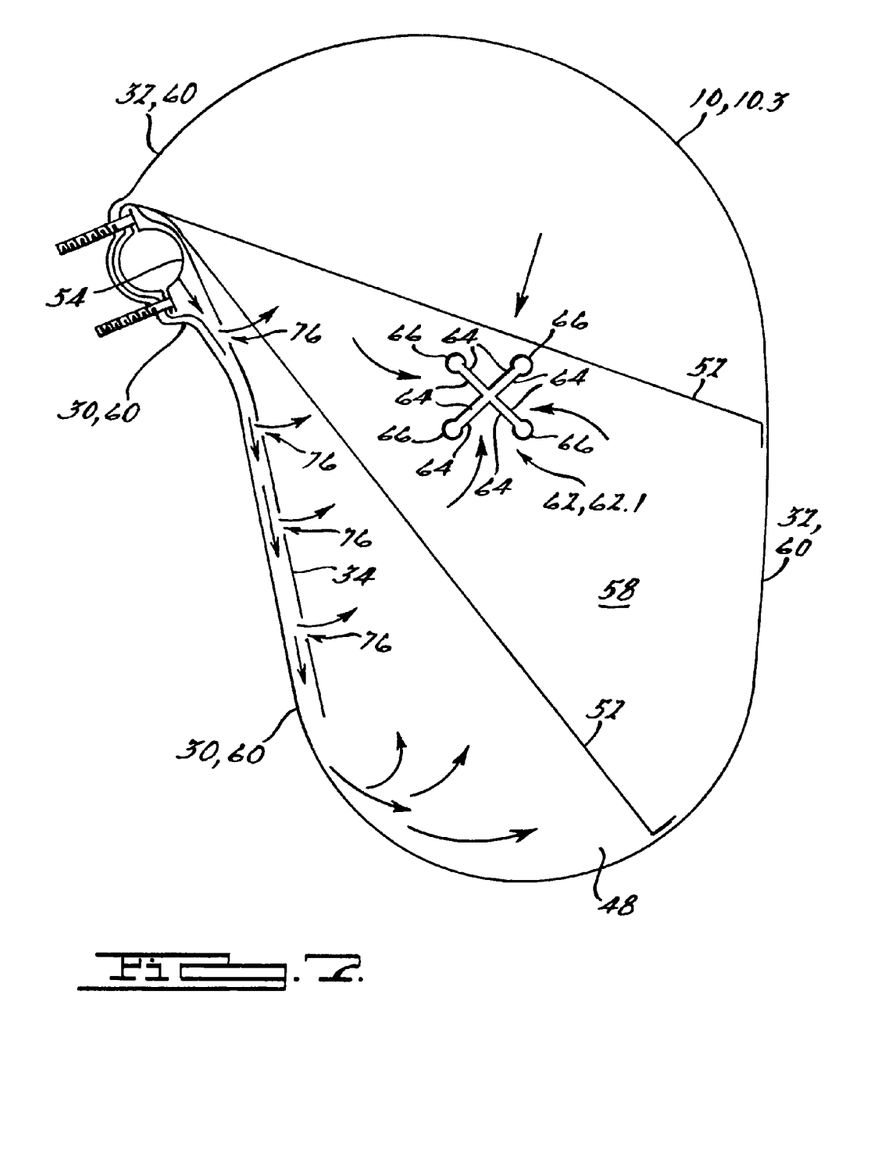
FIG. 7 illustrates a longitudinal cross-sectional view of a third embodiment of an air bag incorporating an internal duct.
Figures 8, 9:
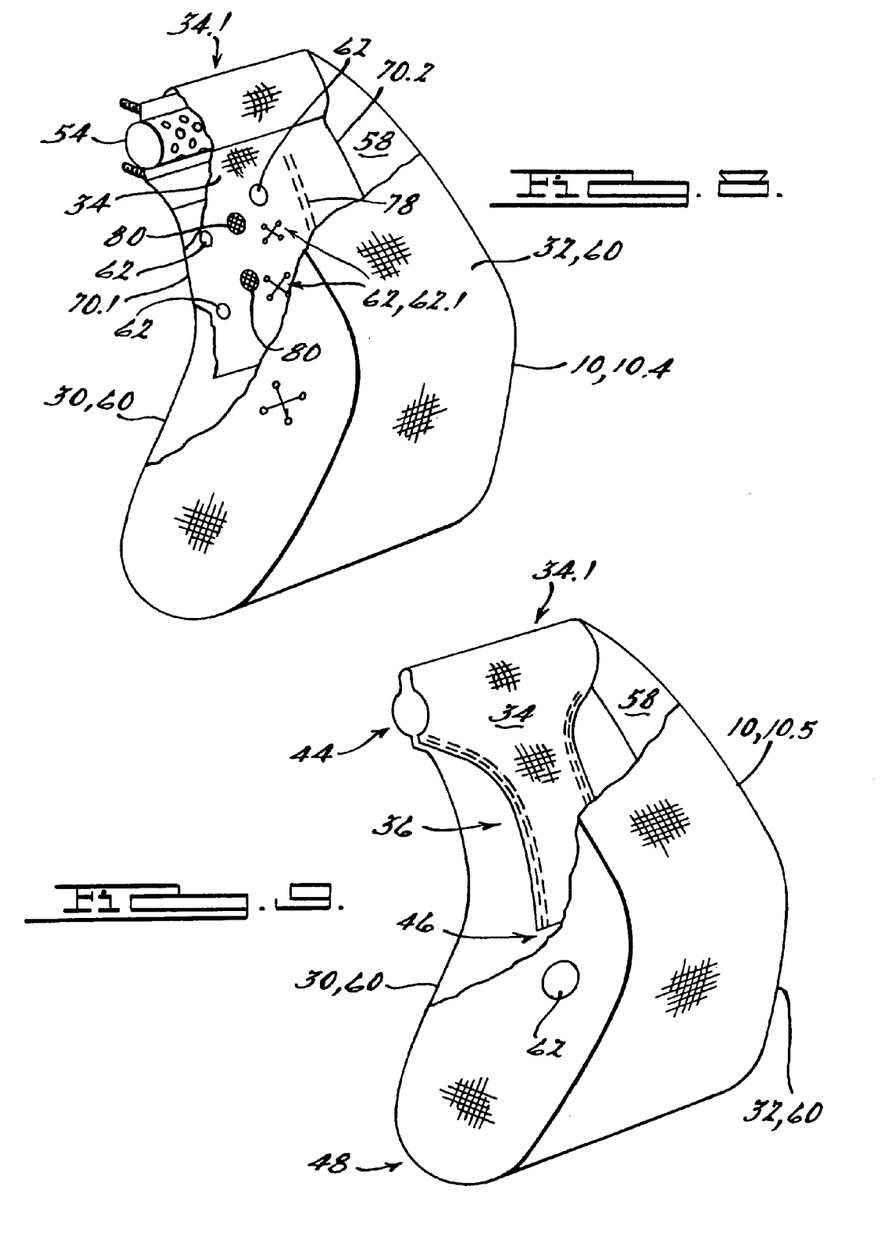
FIG. 8 illustrates an isometric fragmentary sectional view of the third embodiment and a fourth embodiment of an air bag incorporating an internal duct.
FIG. 9 illustrates an isometric fragmentary sectional view of a fifth embodiment of an air bag incorporating an internal duct.

Referring to FIGS. 7 and 8, in accordance with a third embodiment of an air bag 10.3 incorporating an internal duct 36, the inner panel 34 incorporates one or more vents 76 which provide for discharging gas from the duct into the remainder of the air bag 10.3 at associated locations upstream of the terminus 46 of the duct 36, so as to provide for tuning the associated inflation kinematics of the air bag 10.3 by distributing gas flow as needed.

Referring to FIG. 8, in accordance with a fourth embodiment of an air bag 10.4 incorporating an internal duct 36, the inner panel 34 is sized in accordance with the second embodiment of the air bag 10.2 as described hereinabove, and in addition to being secured to the first panel portion 30 at the edges 70.1, 70.2 of the inner panel 34, the inner panel 34 is also secured to first panel portion 30 at intermediate locations therebetween, for example, along intermediate stitch lines 78 or stitch patches 80, or other forms of fastening, so as to provide for limiting the transverse expansion of the duct 36 during pressurization thereof. It should be understood that the third and fourth embodiments are illustrated together in FIG. 8, but need not necessarily be combined in practice.

Referring to FIG. 9, in accordance with a fifth embodiment of an air bag 10.5 incorporating an internal duct 36, the width of the inner panel 34 is narrower than the associated width of the first panel portion 30, so as to provide for limiting the transverse expansion of the duct 36 during pressurization thereof, so as to provide for advancing the inflation of the distal portion 48 of the air bag 10.5 relative to the remaining portion thereof. The inner panel is secured to the first panel portion 30, for example by sewing, bonding or welding.

Figures 10, 11:
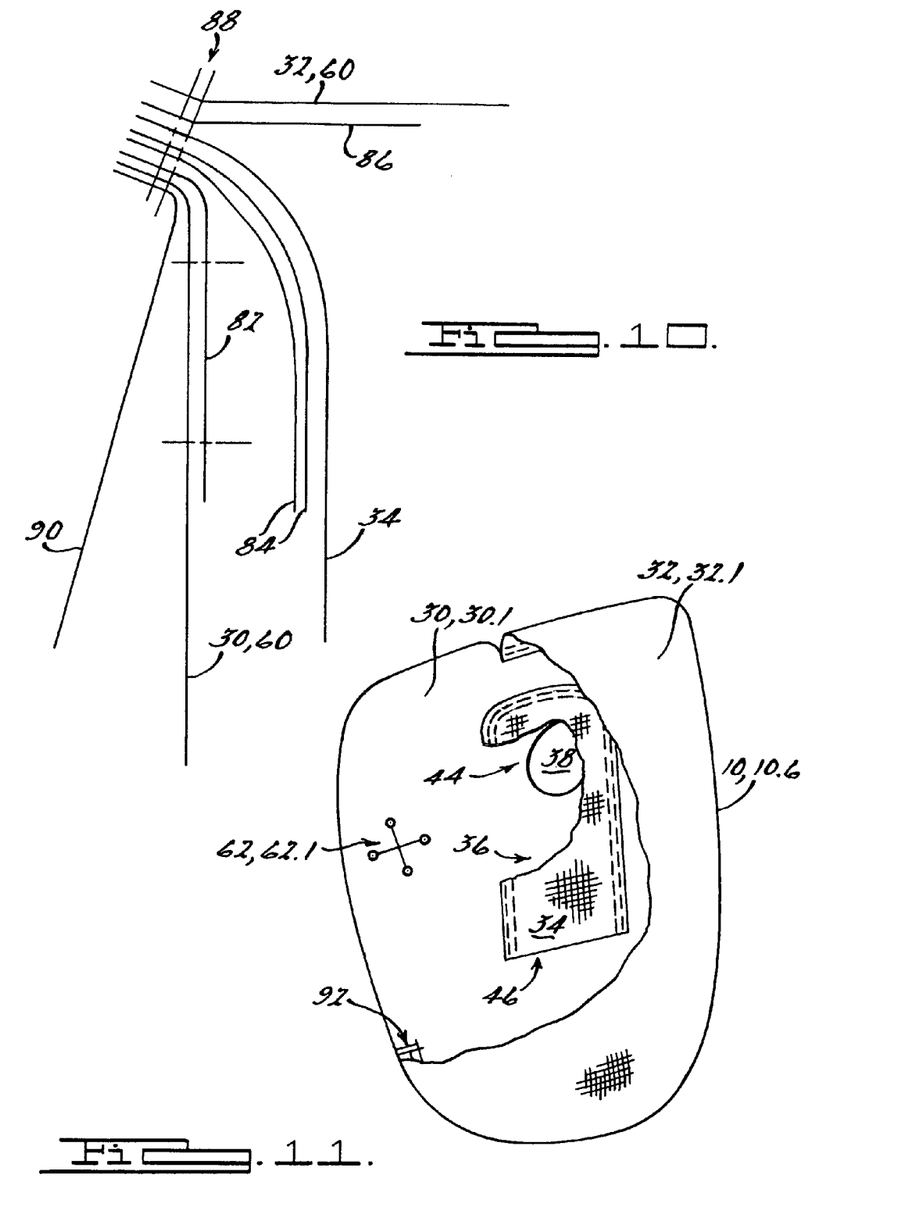
FIG. 10 illustrates a cross-sectional view of a construction detail proximate to an opening portion an air bag incorporating an internal duct.
FIG. 11 illustrates an isometric fragmentary sectional view of a sixth embodiment of an air bag incorporating an internal duct.

Referring to FIG. 10, in one example of a construction detail of air bags 10 incorporating an internal duct 36 proximate to the opening 38 of the air bag 10, the first 30 and second 32 panel portions of a face panel 60 are sandwiched around a first patch panel 82 adjacent the first panel portion 30, a plurality of heat shield panels 84 between the first patch panel 82 and the inner panel 34, and a second patch panel 86 adjacent the second panel portion 32 and between the second panel portion 32 and the inner panel 34, all of which are sewn together at a common seam 88, along with an associated layer of air bag pack wrap material 90 used to assist in packing the air bag 10 in the air bag inflator module 14.

Referring to FIG. 11, in accordance with a sixth embodiment of an air bag 10.6 incorporating an internal duct 36, the air bag 10.6 is constructed of first 30.1 and second 32.1 panels fastened together along a seam 92, wherein the first 30.1 and second 32.1 panels constituted associated first 30 and second 32 panel portions in accordance with the teachings herein above, and an inner panel 34 is operatively coupled to the first panel 30.1 inside the air bag 10.6 so as to define a duct 36 therebetween, wherein a first end 40 of the inner panel 34 is secured to the first panel 30.1 partially around an opening 38 therein so as to define an entrance 44 of the duct 36, wherein the terminus 46 of the duct 36 is located so as to provide for gas discharge into or towards a distal portion 48 of the air bag 10.6.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. An air bag, comprising:
  a. a first panel portion;
  b. a second panel portion, wherein when mounted in a vehicle and inflated therein, said first panel portion defines a vehicle forward boundary of the air bag, said second panel portion defines a vehicle rearward boundary of the air bag, and said first and second panel portions are part of an exterior boundary of said air bag;

c. a first opening, operatively associated with said first panel portion, wherein said first opening is adapted to receive inflation gas from a gas generator;

d. an inner panel operatively coupled and adjacent to said first panel portion, wherein said inner panel is located within said exterior boundary of said air bag, wherein two opposing sides of the inner panel are attached to the first panel portion to form a duct with a volume located between the two attached sides and defined by the inner panel and first panel portion, a portion of said inner panel proximate to a first end thereof substantially surrounds said first opening at a first end of said duct so as to provide for receiving a substantial majority of inflation gas from said gas generator, said inner panel extends from said first end thereof to a second end thereof along a portion of said first panel portion towards a distal portion of the airbag and spaced from said second panel portion during inflation, wherein said distal end of said airbag is distal relative to said first opening, and said second end of said inner panel defines a second end of said duct, and said duct provides for discharging said inflation gas into a first volume portion of the air bag bounded by said first panel portion, wherein said first volume portion is substantially greater than a volume of said duct.

2. An air bag as recited in claim 1, further comprising first and second side panels, wherein said first side panel is connected to a first edge of said first panel portion and to a first edge of said second panel portion, and said second side panel is connected to a second edge opposite to said first edge of said first panel portion and to a second edge opposite to said first edge of said second panel portion.

3. An air bag as recited in claim 1, wherein said first and second panel portions are each portions of a common face panel.

4. An air bag as recited in claim 1, wherein said first and second panel portions are operatively coupled to one another along a periphery of said air bag.

5. An air bag as recited in claim 1, wherein said portion of said inner panel proximate to said first end thereof substantially surrounding said first opening at a first end of said duct is substantially sealed to said air bag.

6. An air bag as recited in claim 1, wherein said inner panel comprises at least one opening along a length of said inner panel so as to provide for fluid communication between said duct and an interior of said air bag through said at least one opening.

7. An air bag as recited in claim 1, wherein said inner panel is secured to said first panel portion at at least one location between edges of said duct.

8. An air bag as recited in claim 1, wherein said inner panel is wrapped around an air bag retainer.

9. An air bag as recited in claim 1, wherein said inner panel is operatively coupled to said first panel portion proximate to said opening so as to substantially sealably couple said duct to said opening.

10. An air bag as recited in claim 1, wherein a width of said inner panel is less than a width of said first panel portion.

11. An air bag as recited in claim 1, further comprising at least one vent on an outer surface of said air bag, wherein said at least one vent provides for fluid communication between said first volume portion of said air bag and a location external to said air bag.

* * * * *